(12) United States Patent
Hartshorn et al.

(10) Patent No.: US 9,500,390 B1
(45) Date of Patent: Nov. 22, 2016

(54) HELIOSTAT FIELD POWER CONTROLLER FOR SETTING A THROTTLE TO DETERMINE AN OPTIMUM DISTRIBUTION OF ENERGY

(71) Applicant: eSolar, Burbank, CA (US)

(72) Inventors: Matthew Hartshorn, Los Angeles, CA (US); Adam Azarchs, Pasadena, CA (US); Michael Slack, South Pasadena, CA (US); David Gross, Tustin, CA (US); Andrew Zillmer, North Hollywood, CA (US)

(73) Assignee: ESOLAR, INC., Burbank, CA (US)

( * ) Notice: Subject to any disclaimer, the term of this patent is extended or adjusted under 35 U.S.C. 154(b) by 599 days.

(21) Appl. No.: 13/677,238

(22) Filed: Nov. 14, 2012

Related U.S. Application Data

(60) Provisional application No. 61/559,505, filed on Nov. 14, 2011.

(51) Int. Cl.
   *F24J 2/40*     (2006.01)
(52) U.S. Cl.
   CPC ...... *F24J 2/407* (2013.01); *F24J 2/40* (2013.01); *F24J 2/402* (2013.01); *F24J 2/405* (2013.01)
(58) Field of Classification Search
   CPC .............. F24J 2/07; F24J 2/38; F24J 2/40; F24J 2/402; F24J 2/405; F24J 2/074; F24J 2/407; F24J 2002/1076; Y02E 10/41; Y02E 10/47; Y02E 10/52
   USPC .............................................. 353/3
   See application file for complete search history.

(56) References Cited

U.S. PATENT DOCUMENTS

| 8,001,960 | B2 * | 8/2011 | Gilon | F03G 6/06 126/572 |
|---|---|---|---|---|
| 8,327,840 | B2 * | 12/2012 | Gilon | F03G 6/06 126/572 |
| 8,365,718 | B2 * | 2/2013 | Gilon | F03G 6/06 126/572 |
| 8,365,719 | B2 * | 2/2013 | Caldwell | F24J 2/07 126/600 |
| 8,490,618 | B2 * | 7/2013 | Kroizer | F24J 2/0494 126/571 |
| 8,739,775 | B2 * | 6/2014 | Kroyzer et al. | 126/601 |
| 8,931,475 | B2 * | 1/2015 | Gilon | F24J 2/07 126/572 |
| 9,222,702 | B2 * | 12/2015 | Goldberg | F24J 2/38 |
| 2008/0295883 | A1 * | 12/2008 | Ducellier | G05B 15/02 136/246 |
| 2009/0038608 | A1 * | 2/2009 | Caldwell | F24J 2/07 126/600 |

(Continued)

FOREIGN PATENT DOCUMENTS

WO    WO 2009103077 A2 *    8/2009    ....... H01L 31/052

*Primary Examiner* — Bao-Luan Le
(74) *Attorney, Agent, or Firm* — Brooks Acordia IP Law, P.C.; Pejman Yedidsion

(57) ABSTRACT

Methods and systems for setting a throttle at a solar power plant, by a controller, the controller configured to select at least one aim point on a receiver of the solar power plant, calculate a desired energy to be delivered by two or more subgroups to each selected aim point via a search method based on an aiming scheme, and determine an optimum distribution of energy to be delivered to the receiver across the two or more subgroups via a search program based on the calculated desired energy.

17 Claims, 12 Drawing Sheets

(56) References Cited

U.S. PATENT DOCUMENTS

| | | | |
|---|---|---|---|
| 2009/0107485 A1* | 4/2009 | Reznik | F24J 2/07 126/600 |
| 2009/0178668 A1* | 7/2009 | Boggavarapu | F03D 9/007 126/601 |
| 2009/0217921 A1* | 9/2009 | Gilon | F03G 6/06 126/600 |
| 2010/0006087 A1* | 1/2010 | Gilon | F24J 2/07 126/572 |
| 2010/0031952 A1* | 2/2010 | Zavodny | F24J 2/07 126/573 |
| 2010/0139644 A1* | 6/2010 | Schwarzbach | F24J 2/07 126/573 |
| 2010/0191378 A1* | 7/2010 | Gilon | F24J 2/38 700/275 |
| 2010/0282242 A1* | 11/2010 | Gilon | F03G 6/06 126/600 |
| 2011/0036343 A1* | 2/2011 | Kroyzer et al. | 126/574 |
| 2012/0024282 A1* | 2/2012 | Gilon | F03G 6/06 126/595 |
| 2012/0125000 A1* | 5/2012 | Olavarria Rodriguez-Arango et al. | 60/641.11 |
| 2012/0192857 A1* | 8/2012 | Carlson et al. | 126/573 |
| 2012/0304981 A1* | 12/2012 | Olsen | 126/601 |
| 2013/0206209 A1* | 8/2013 | Lasich | 136/246 |

\* cited by examiner

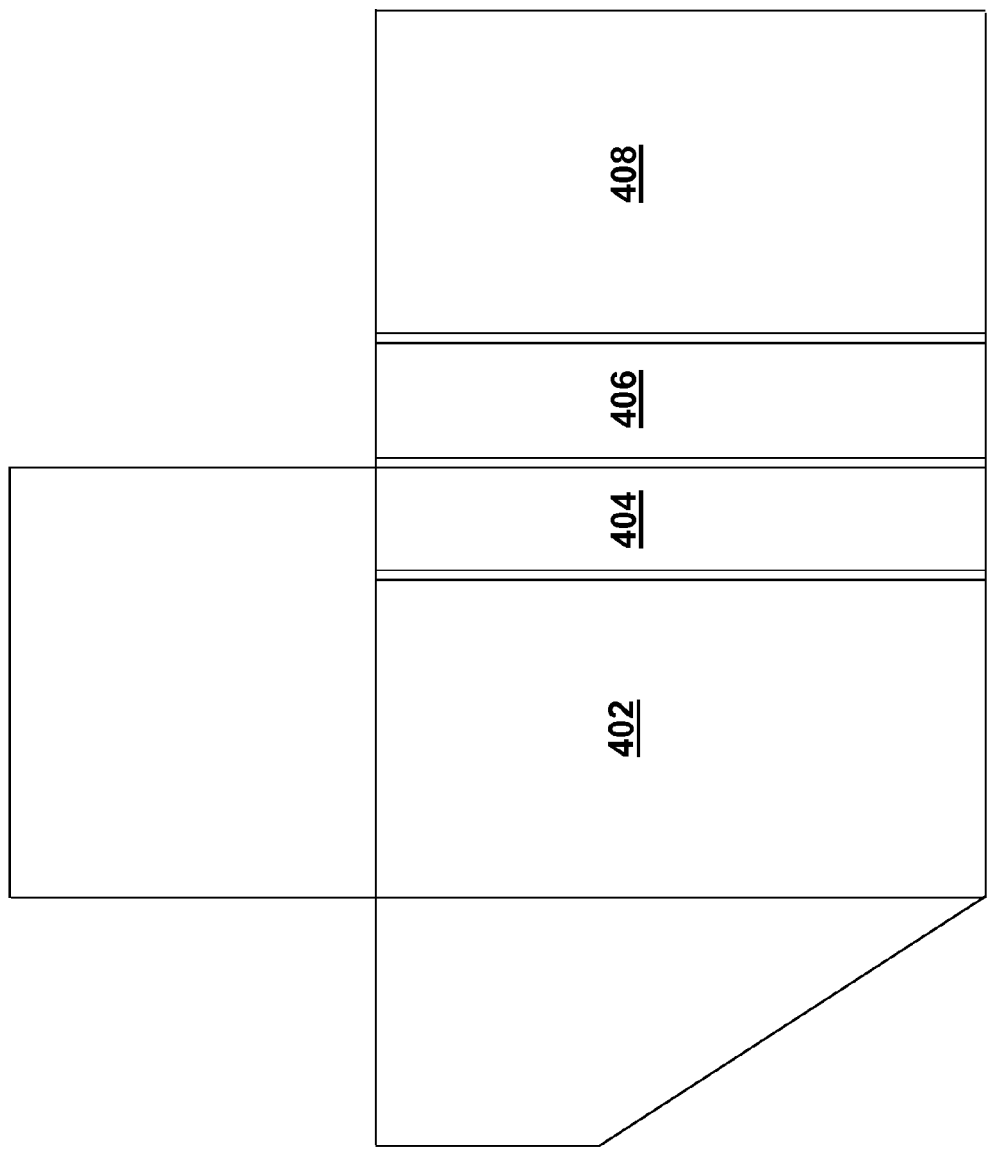

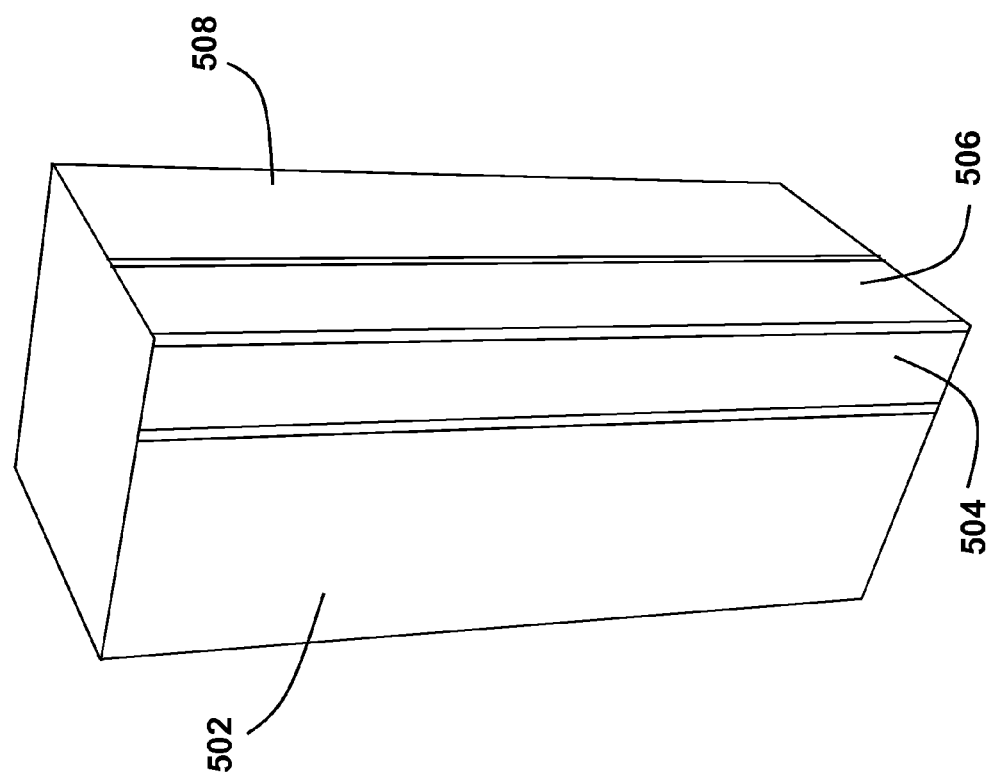

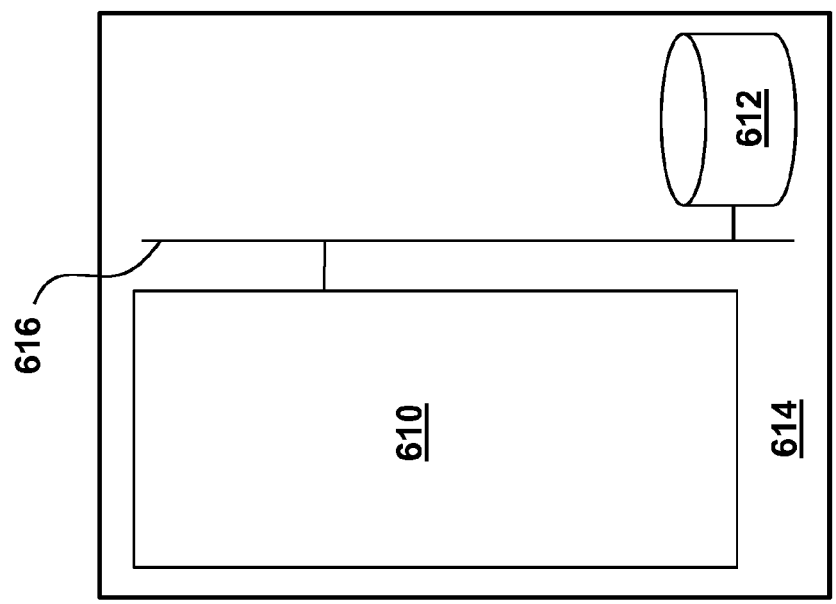

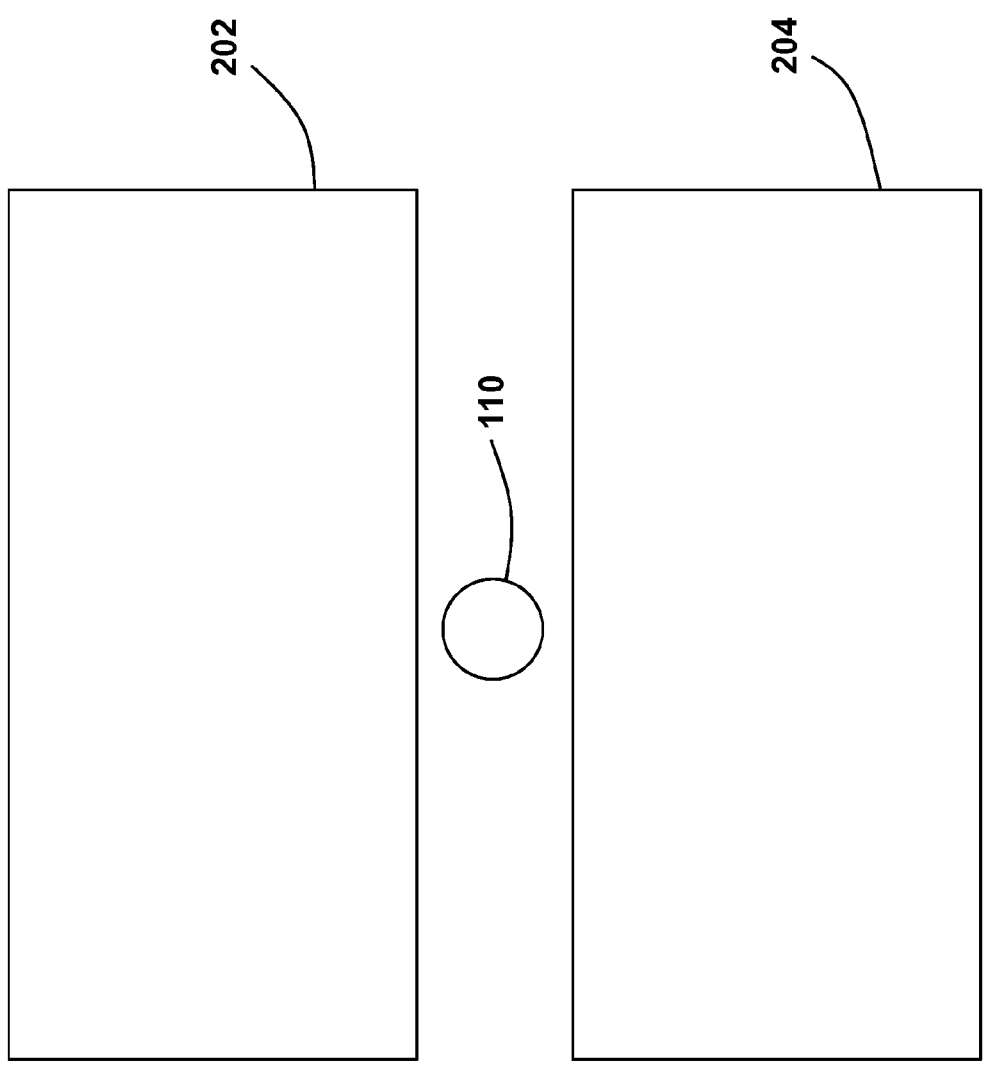

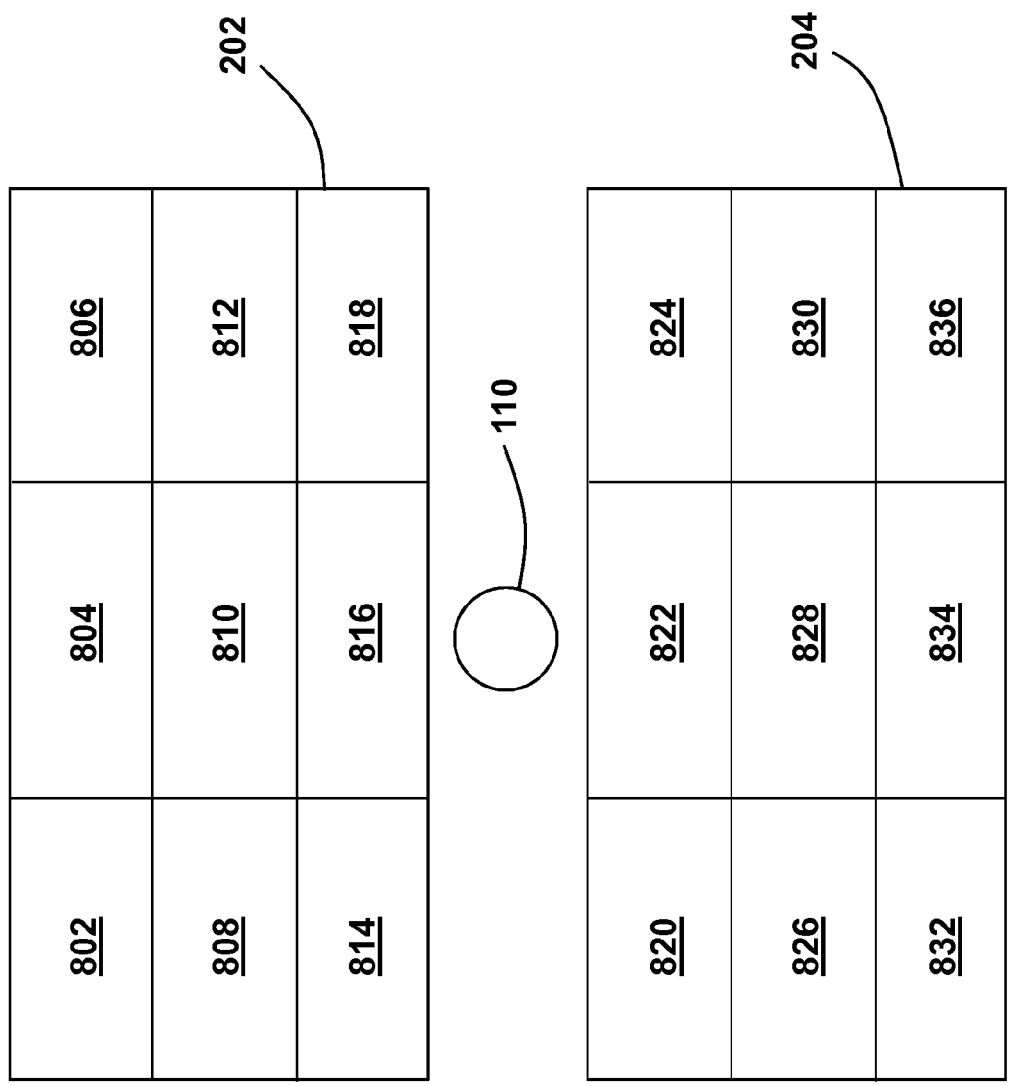

HELIOSTAT FIELD POWER CONTROLLER FOR SETTING A THROTTLE TO DETERMINE AN OPTIMUM DISTRIBUTION OF ENERGY

CROSS-REFERENCE TO RELATED APPLICATIONS

This application claims priority to and the benefit of U.S. Provisional Patent Application Ser. No. 61/559,505, filed Nov. 14, 2011, which is hereby incorporated by reference in its entirety for all purposes.

TECHNICAL FIELD

The invention relates to the field of central receiver solar power plants and more particularly to devices, systems, and methods for controlling heliostat position throughout the day so as to reflect incident Sunlight onto the central receiver.

BACKGROUND

Central receiver solar power plants utilize one or more heliostat fields to redirect flux from the Sun to the central receiver. The central receiver may be composed of one or more heat absorbing panels. These panels may have limits on the amount of power that may be safely directed on them by the heliostat fields.

SUMMARY

Exemplary method embodiments may include a method of setting a throttle at a solar power plant, by a controller having a processor and addressable memory, the method comprising: selecting at least one aim point on a receiver of the solar power plant; calculating a desired energy to be delivered by two or more subgroups to each selected aim point via a search method based on an aiming scheme; and determining an optimum distribution of energy to be delivered to the receiver across the two or more subgroups via a search program based on the calculated desired energy. In additional embodiments, the method may further comprise designating one or more heliostats of each of the two or more subgroups to deliver energy to the receiver based on the determined optimum distribution of energy. In additional embodiments, the method may further comprise commanding the designated one or more heliostats to deliver energy to the receiver. In additional method embodiments, the one or more heliostats of each of the two or more subgroups may be designated to minimize the total number of heliostats moved during operation. In additional embodiments, the method may further comprise determining a plurality of desired energy calculations, wherein the search program is configured to select a desired energy of the plurality of desired energy calculations based on meeting a program demand. In additional method embodiments, the search method may be configured to determine the optimum spread of energy across two or more subgroups. In additional method embodiments, the search program may be at least one of: a linear program, a linear walk, a binary search, and a heuristic optimization.

Other exemplary method embodiments include a method of controlling heliostats, by a controller having a processor and addressable memory, the method comprising: calculating a range of intervals to supply power to a receiver that meet a throttle power demand; filtering the calculated range of intervals based on at least one constraint; and setting an optimal value across the filtered range. In additional embodiments, the method may further comprise commanding one or more heliostats to change position to achieve the set optimal value. In additional method embodiments, the optimal value may be updated on a recurring basis. In additional method embodiments, the optimal value may be a maxima or a minima. In additional method embodiments, the set optimal value may be further configured to satisfy at least one constraint, the constraint may have a minima and a maxima, and where the at least one constraint may includes at least one of: throttle level, average flux on a receiver, average flux on a receiver panel, peak flux on a receiver, peak flux on a receiver panel, uniformity of flux contribution from subgroups, and uniformity of flux on receiver panels.

Other exemplary method embodiments may include a method of controlling heliostats, by a controller having a processor and addressable memory, the method comprising: dividing a heliostat field into one or more subgroups, where the division is based on a power contribution and a minimization of heliostat movement wait time due to one or more limitations. In additional method embodiments, the one or more limitations may be an electrical power time limit per subgroup.

Exemplary system embodiments may include a heliostat field power controller system comprising: a processor and addressable memory; the processor configured to: divide a heliostat field into two or more subgroups; determine a subgroup to panel contribution table (SPC) comprising an amount of power each subgroup of the two or more subgroups can provide to a set of heat-absorbing panels on a central receiver; determine a total power level requested by the receiver based on a received feedback from one or more sensors; and determine a subgroup power level from each subgroup based on each heat-absorbing panel via the determined SPC and at least one variable; where the sum of the determined subgroup power levels from each subgroup to each heat-absorbing panel may be less than or equal to the determined total power level requested. In additional exemplary embodiments, the at least one variable may be a limit of the power to be received by each heat-absorbing panel on the central receiver, a known position of the heliostats in the heliostat field, a known position of the central receiver, a known geometry of each of the heat-absorbing panels on the central receiver, a position of the Sun, and a measurement of Direct Normal Insolation. In additional exemplary embodiments, the limit of power to be received by each heat-absorbing panel on the central receiver may be at least one of: a critical safety constraint and a user defined limit that is less than the critical safety constraint. In additional exemplary embodiments, the critical safety constraint may be based on the received feedback of the one or more sensors. In additional exemplary embodiments, the received feedback from the one or more sensors may be a measurement of at least one of: a temperature of each heat-absorbing panel on the central receiver, a temperature of a piping, a pressure in the central receiver, and a pressure in the piping. In additional exemplary embodiments, the determined SPC may be a matrix of the power that each subgroup can deliver to each heat-absorbing panel of the central receiver. In additional exemplary embodiments, the determined SPC may be based on the number of heliostats pointed at the central receiver, the geometry of the heliostats, and the Direct Normal Insolation. In additional exemplary embodiments, the determined SPC may be further based on the position of the Sun and/or on a heliostat group aiming strategy. In additional exemplary embodiments, the processor may be further configured to: determine, according to the heliostat group aiming strategy, an aim group center for each subgroup of the two or more subgroups. In additional exemplary embodiments, the processor may be further configured to: determine an individual aim point for one or more heliostats in each subgroup of the two or more subgroups, where the individual aim point for the one or more heliostats may be perturbed from the aim group center for each subgroup of the two or more subgroups. In additional exemplary embodiments, the individual aim points may be positioned at a distance from the aim group center to allow for flux uniformity on the central receiver and/or minimize flux missing the central receiver. In additional exemplary embodiments, the heliostat field division is based on geographical constraints. In additional exemplary embodiments, the subgroup power level from each subgroup to each heat-absorbing panel may be determined by a Linear Program Simple Procedure (LPSP), where the LPSP satisfies one or more inequalities. In additional exemplary embodiments, the inequalities may be at least one of: the panel limit may not be exceeded by the total power focused on a given panel, the power level requested by each subgroup may not exceed the power level each subgroup is capable of providing, and the total power requested may not exceed the requested throttle level. In additional exemplary embodiments, the processor may be further configured to: compare the power level of each subgroup with the power level of a remaining set of subgroups based on a determined largest normalized subgroup level.

Exemplary methods embodiments include a method of controlling a heliostat field by a heliostat field power controller, the method comprising: dividing a heliostat field into two or more subgroups; determining a subgroup to panel contribution table (SPC) comprising an amount of power each subgroup of the two or more subgroups can provide to a set of heat-absorbing panels on a central receiver; determining a total power level requested by the receiver based on a received feedback from one or more sensors; and determining a subgroup power level from each subgroup based on each heat-absorbing panel via the determined SPC and at least one variable; where the sum of the determined subgroup power levels from each subgroup to each heat-absorbing panel is less than or equal to the determined total power level requested. In additional exemplary method embodiments, the at least one variable may be a limit of the power to be received by each heat-absorbing panel on the central receiver, a known position of the heliostats in the heliostat field, a known position of the central receiver, a known geometry of each of the heat-absorbing panels on the central receiver, a position of the Sun, and a measurement of Direct Normal Insolation. In additional exemplary method embodiments, the limit of power to be received by each heat-absorbing panel on the central receiver may be at least one of: a critical safety constraint and a user defined limit that may be less than the critical safety constraint.

BRIEF DESCRIPTION OF THE DRAWINGS

Embodiments are illustrated by way of example and not limitation in the figures of the accompanying drawings, in which:

FIG. 4 depicts an exemplary cavity central receiver with flattened internal surfaces;
FIG. 5 depicts an exemplary external central receiver;
FIG. 6B depicts an exemplary control processing unit for controlling the heliostat field;
FIG. 7 depicts an exemplary heliostat field layout with a central receiver positioned between two heliostat arrays;
FIG. 8 depicts an exemplary heliostat field layout with a central receiver positioned between two heliostat arrays divided into subgroups.

DETAILED DESCRIPTION

Figure 1:
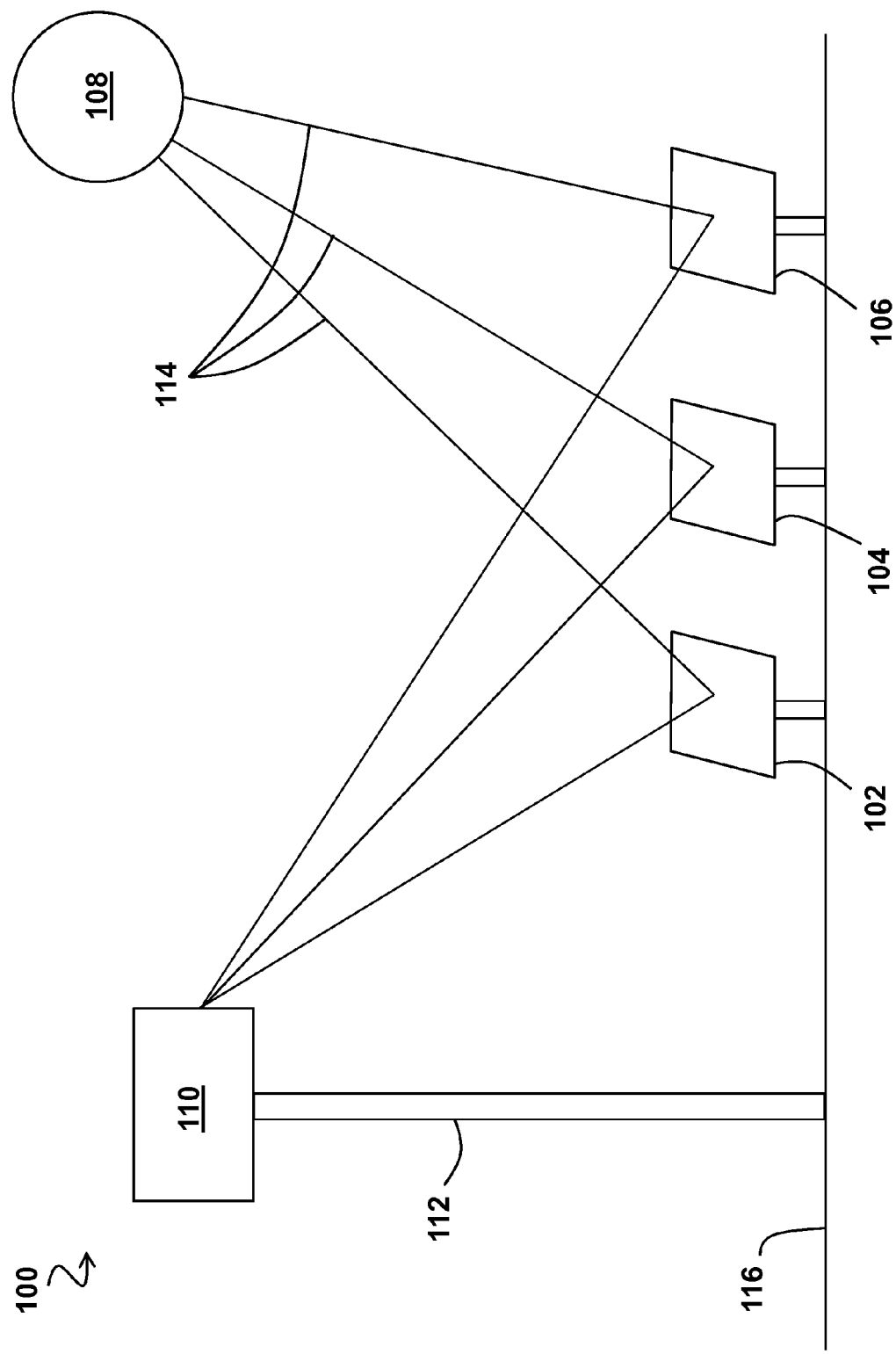
FIG. 1 depicts an exemplary central receiver solar plant.

FIG. 1 depicts an exemplary central receiver solar plant 100. The plant may comprise one or more ground-mounted heliostats 102,104,106. The one or more heliostats 102,104,106 may be grouped into one or more heliostat arrays (see FIG. 2). The heliostats may be configured to reflect flux 114 from the Sun 108 toward a central receiver 110. The central receiver 110 may be mounted on a tower 112 at an elevated position such that the heliostats 102,104,106 may have a clear field of view to reflect flux 114 toward the central receiver 110. As the Sun 108 changes position in the sky relative to the ground 116 throughout the day, the heliostats 102,104,106 may change position to continue reflecting incident flux 114 from the Sun 108 onto the central receiver 110.

Figure 2:
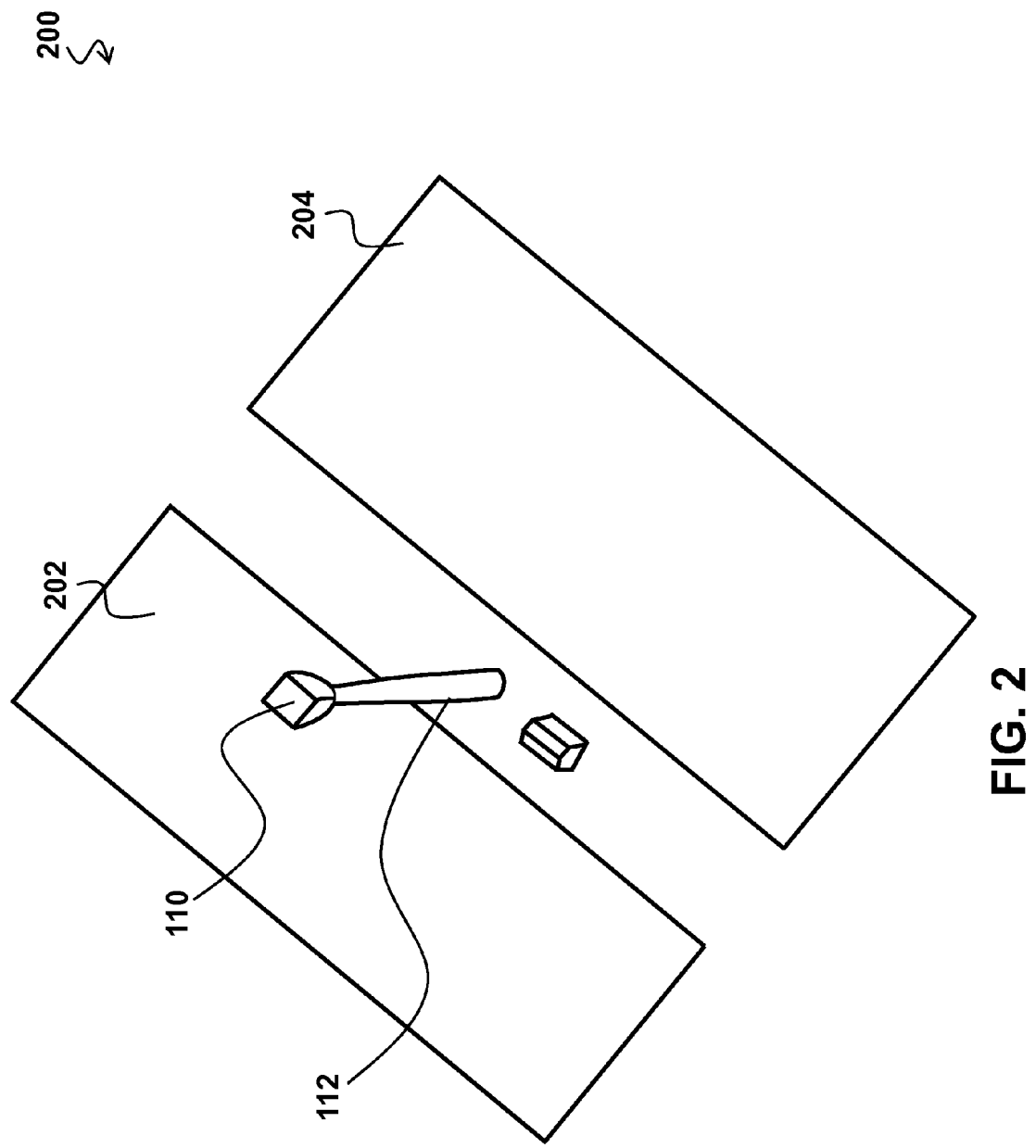
FIG. 2 depicts a perspective view of an exemplary solar thermal receiver positioned between two heliostat arrays.

FIG. 2 depicts a perspective view of an exemplary solar thermal receiver positioned between two heliostat arrays 200. The central receiver 110 may be positioned between a first heliostat array 202 and a second heliostat array 204. An exemplary solar plant may comprise two or more central receivers 110, and each central receiver 110 may have two or more corresponding heliostat arrays 202,204 to reflect incident Sunlight to their central receiver 110 mounted on a tower 112.

Figure 3:
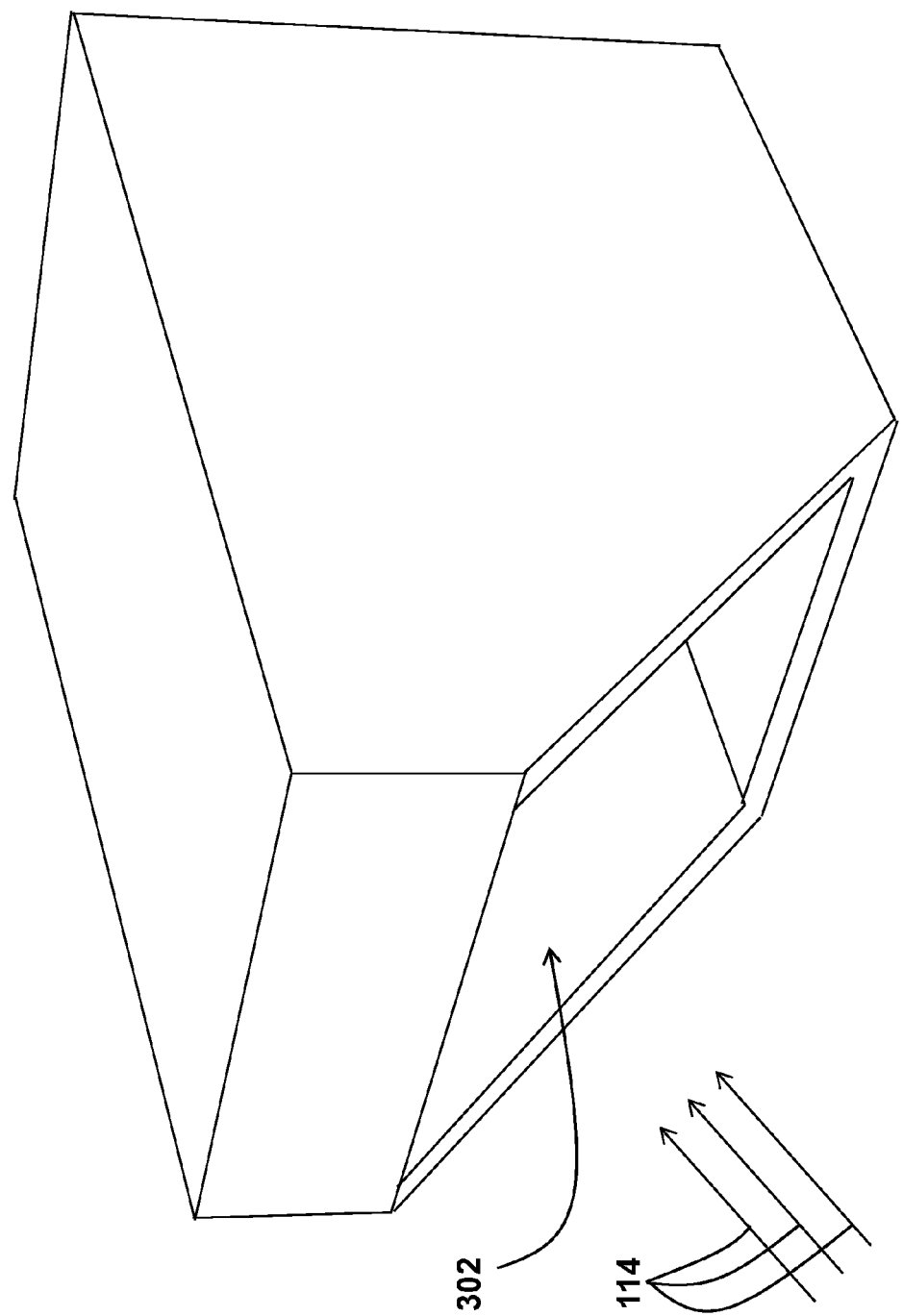
FIG. 3 depicts an exemplary cavity central receiver.

FIG. 3 depicts an exemplary cavity central receiver 300. Heat absorption in the cavity central receivers 300 occurs internally as flux 114 is directed through an opening 302. The heat absorbing portion of the cavity central receiver 300 may be subdivided into one or more portions (see FIG. 4).

FIG. 4 depicts an exemplary cavity central receiver with flattened internal surfaces 400. The cavity central receiver may be subdivided into one or more panels. The exemplary cavity central receiver may comprise a first internal panel 402, a second internal panel 404, a third internal panel 406, and a fourth internal panel 408. The panels 402,404,406,408 may comprise abutted pipes carrying a heat transfer fluid, e.g., water, a photovoltaic surface, or other materials, and/or solids, e.g., cerium oxide. The material of the panels 402, 404,406,408 may be any light and/or heat absorbing material. The panels 402,404,406,408 may be chosen such that the power limit on each panel is controlled uniformly. Thus, the power limit on each of the panels 402,404,406,408 may be uniform across the panel.

FIG. 5 depicts an exemplary external central receiver 500. The central receiver 500 may comprise four external panels in a four-panel subdivision. The first external panel 502, the second external panel 504, the third external panel 506, and the fourth external panel 508 may comprise at least one of abutted pipes carrying a heat transfer fluid, e.g., water, a photovoltaic surface, or other materials. One or more thermo-mechanical design considerations may specify a limit of power, i.e., the area integral of flux, which may fall safely on each of the panels 502,504,506,508. The amount of power needed for the plant may be determined by a high-level plant operational control. This control may then request this determined amount of power by sending an aiming command to one or more heliostats of the one or more heliostat arrays. This may result in an increase or decrease in power being reflected from the heliostats onto the central receiver 500.

Figure 6A:
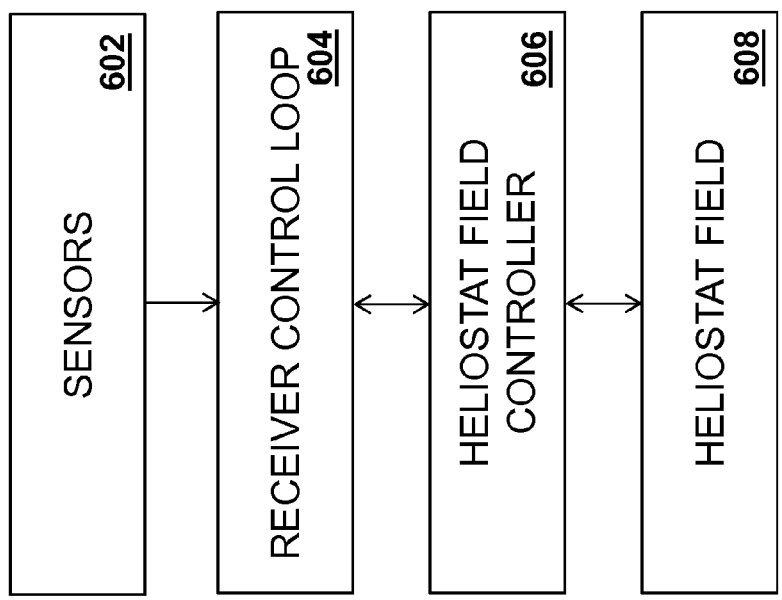
FIG. 6A depicts an exemplary data flow architecture.

FIG. 6A depicts an exemplary data flow architecture 600. The power requested by a controller may vary during the operation of the plant. During start-up and/or shutdown of the plant, the requested power may be less than the maximum power possible to be delivered. During a running operation, once the plant has gone through start-up and before shut-down, the requested power may be equal to or less than the maximum power possible to be delivered. The Heliostat Field Controller 606 may be configured to send commands to the heliostat field 608 and receive feedback from the heliostat field 608. The Heliostat Field Controller 606 may also be configured to generate configuration commands to each individual heliostat in the heliostat field 608. The Heliostat Field Controller 606 may generate a command to direct one or more heliostats to reflect Sunlight toward a given point, where the normal of the heliostat is the bisector of the Sun and the target direction. The Heliostat Field Controller 606 may take in measurements from one or more sensors 602. These measurements may be direct and/or indirect, and may be at least one of local working fluid temperatures and state information pertaining to the group and/or individual receivers. In some embodiments, the control inputs, and/or output functions of the Heliostat Field Controller 606 may be distributed to two or more controllers. The Heliostat Field Controller 606 may receive one or more power allocation commands from a Receiver Control Process in a Receiver Control Loop 604. These power allocation commands may include instructions on how to allocate the available reflected power to each receiver panel (see FIGS. 4-5). The Receiver Control Process may formulate a power allocation based on at least one of operational conditions and input from sensors 602. The sensors 602 may be configured to measure at least one of: temperature of the receiver, temperature of the piping, pressure in the receiver, pressure in the piping, and others. The Receiver Control Process power allocation may seek to maintain steam conditions and/or prevent the overheating of parts of the receiver. The system may translate per-power heliostat panel power requirements specified by the Receiver Control Loop 604 into specific heliostat field 608 aiming strategies.

FIG. 6B depicts an exemplary control processing unit for controlling the heliostat field 601. The system may comprise one or more control processing units 614 having a processor 610 and memory 612 addressable with a data bus 616. The one or more processing units 614 may be used to determine values, e.g., the target direction and direction of one or more heliostats to achieve a requested power level. The control processing unit 601 may control a single heliostat or a group of heliostats. The control processing unit 601 may be configured to generate individual and/or group-wise optimal orientation commands to one or more heliostat servos of the one or more heliostat arrays. These generated commands may be based on at least one of: state values, coefficients, and a performance index. The performance index may characterize the light distribution on the central receiver.

FIG. 7 depicts an exemplary heliostat field layout with a central receiver 110 positioned between a first heliostat array 202 and a second heliostat array 204. Each heliostat array 202,204 may consist of two or more rows of heliostats arranged in a rectangular shape. The first heliostat array 202 may be positioned north of the central receiver 110 and the second heliostat array 204 may be positioned south of the central receiver 110.

FIG. 8 depicts an exemplary heliostat field layout with a central receiver 110 positioned between two heliostat arrays 202,204 divided into subgroups. The first heliostat array 202 may be divided into two or more subgroups. In this exemplary embodiment, each heliostat array 202,204 may be divided into a grid of nine subfields. The first heliostat array 202 may comprise the subgroups SG1 802, SG2 804, SG3 806, SG4 808, SG5 810, SG6 812, SG7 814, SG8 816, and SG9 818. The second heliostat array 204 may comprise the subgroups SG10 820, SG11 822, SG12 824, SG13 826, SG14 828, SG15 830, SG16 832, SG17 834, and SG18 836.

Figure 9:
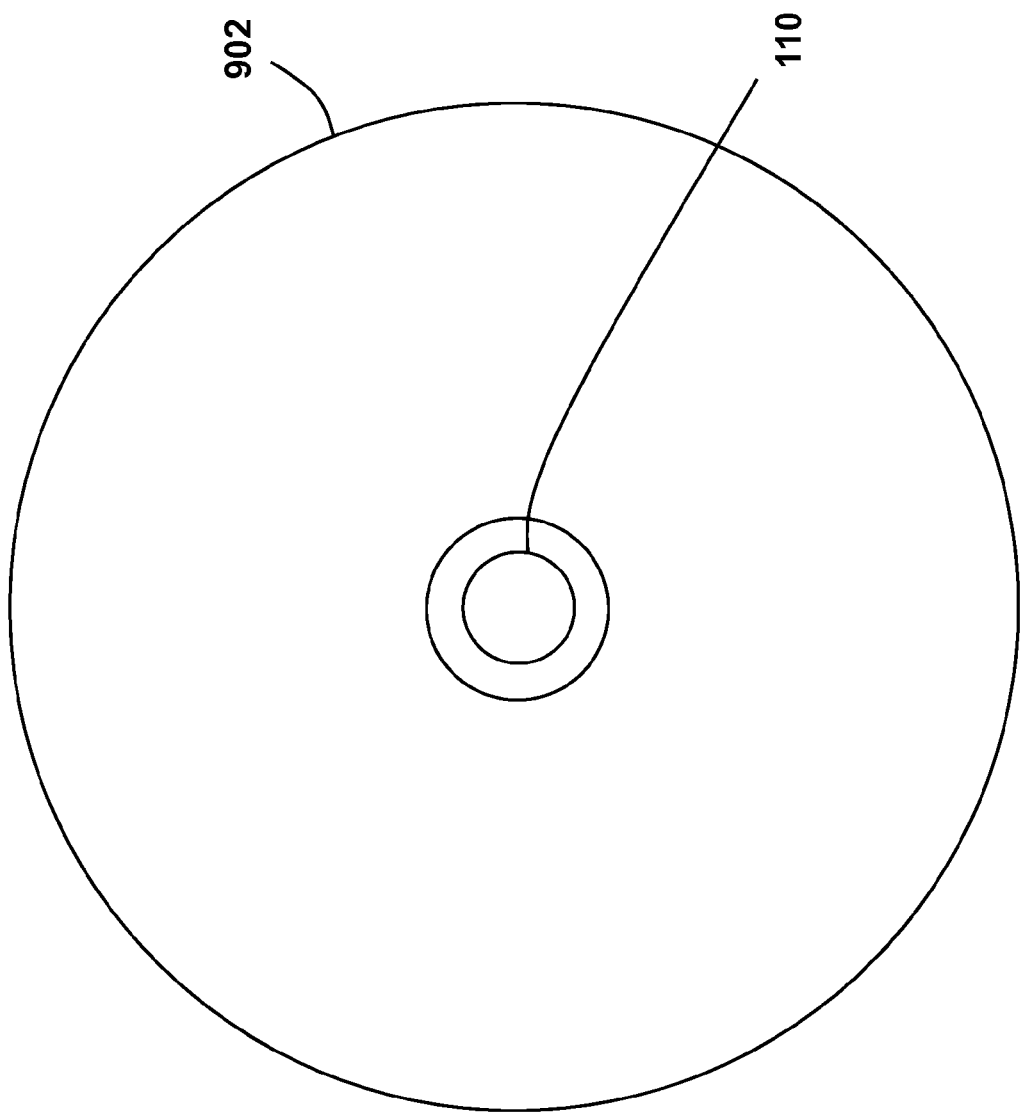
FIG. 9 depicts an exemplary circular heliostat field layout with a central receiver positioned in the center of the heliostat field.

FIG. 9 depicts an exemplary circular heliostat field layout with a central receiver 110 positioned in the center of the circular heliostat field 902.

Figure 10:
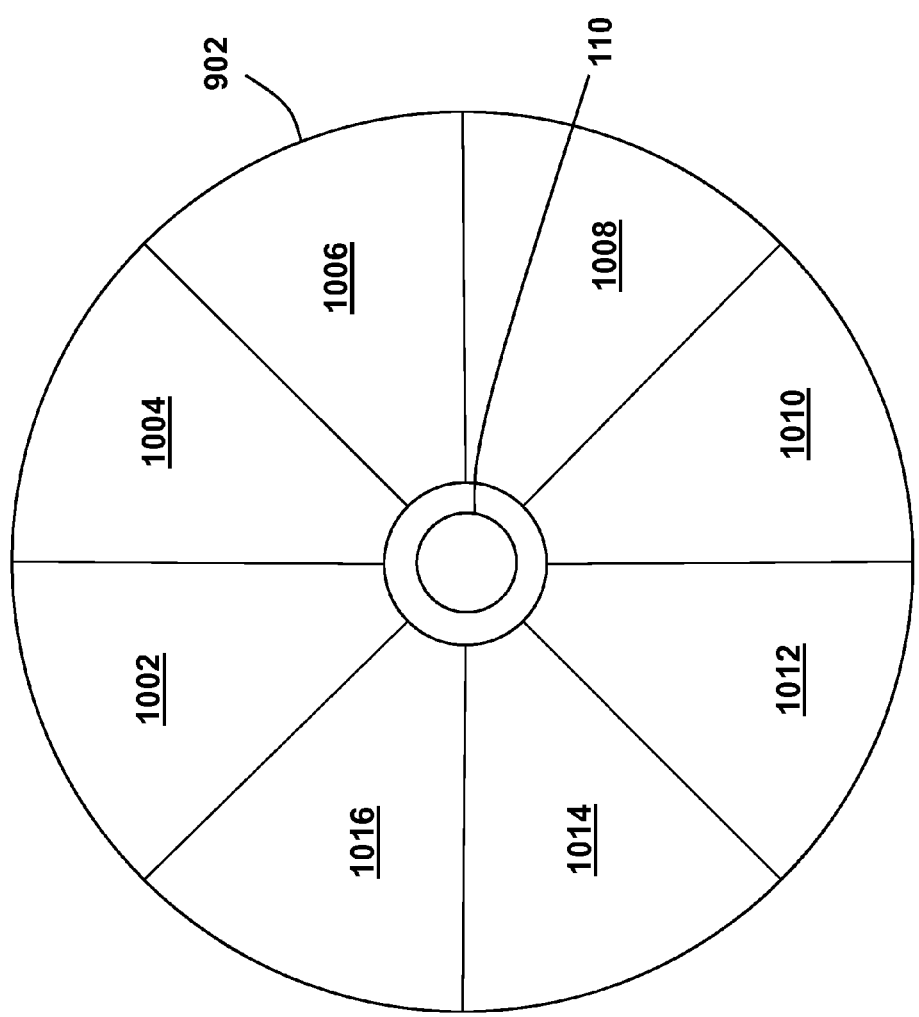
FIG. 10 depicts an exemplary circular heliostat field layout with a central receiver positioned in the center of the heliostat field divided into subgroups.

FIG. 10 depicts an exemplary circular heliostat field layout with a central receiver 110 positioned in the center of the circular heliostat field 902 divided into subgroups. The circular heliostat field 902 may be radially-symmetric and comprise two or more subgroups. The heliostat field 902 may comprise the radially-defined subgroups SG1 1002, SG2 1004, SG3 1006, SG4 1008, SG5 1010, SG6 1012, SG7 1014, and SG8 1016. In some embodiments, the heliostat field 902 may be divided into subgroups so as to maximize differences between the SPC for each subgroup.

Figure 11:
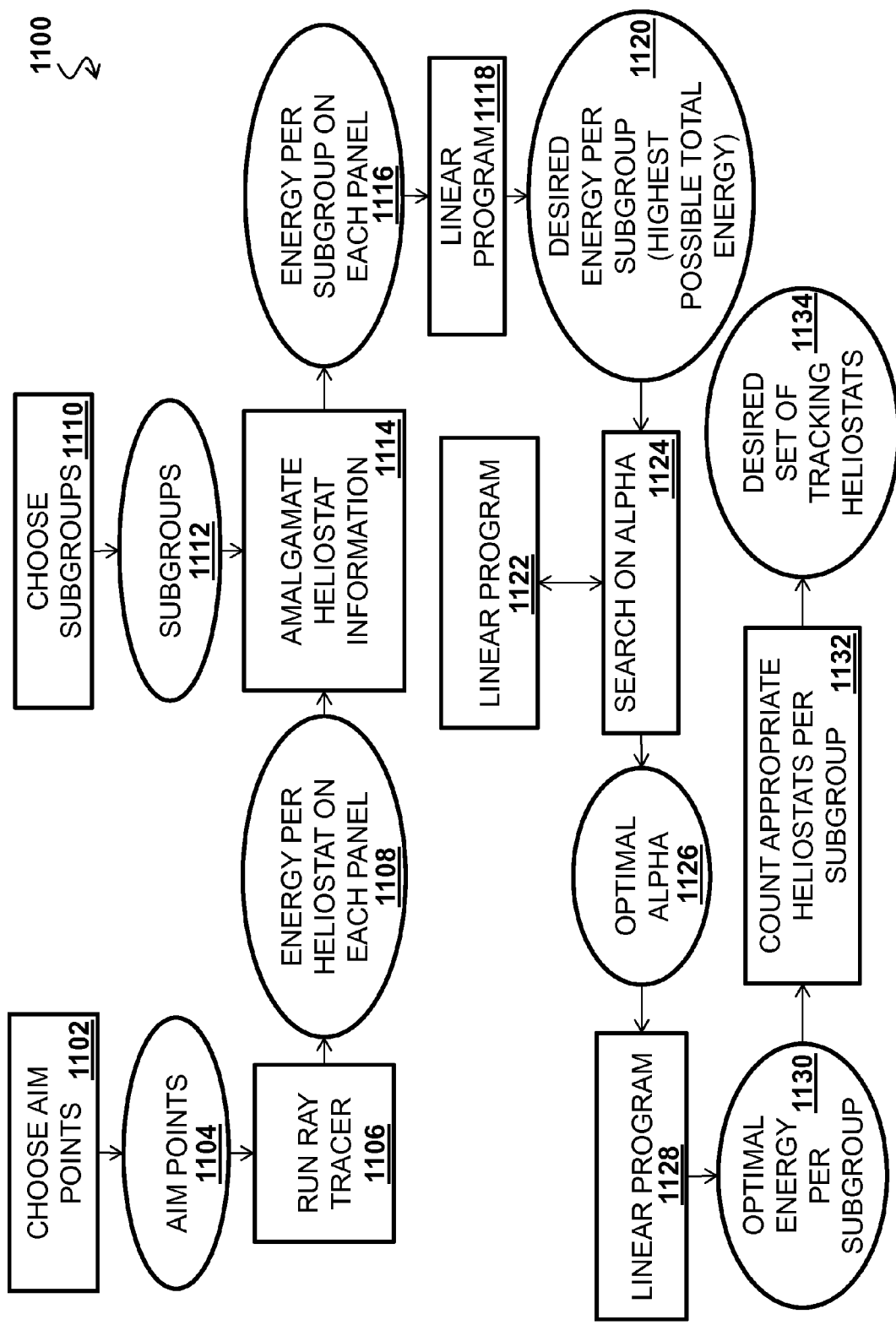
FIG. 11 depicts a flowchart of an exemplary system for positioning heliostats to maximize power on a central receiver given certain constraints.

FIG. 11 depicts a flowchart of an exemplary system for positioning heliostats to maximize power on a central receiver given certain constraints 1100. This sequence may be executed by a processor having addressable memory. First, the processor may choose one or more aim points 1102 on a central receiver. Then, the processor may calculate heliostat location pointing data for those aim points 1104. A ray trace may be run 1106 to calculate the energy per heliostat on each panel 1108. Heliostat subgroups may then be chosen 1110 by, for example, existing programming in the processor and/or a user selection of subgroups. Amalgamated heliostat information 1114 may be created by combining the result of the run ray tracer 1106 and the selected subgroups 1112. In some embodiments, the creation of amalgamated heliostat information 1114 may be on a shorter timescale than the running of ray tracing. For example, the choice of aim points 1102 and the selection of subgroups 1110 may occur only once at commissioning time, or it may occur during a daily or yearly update. Then, the ray tracer may be run in intervals of approximately five minutes, while the amalgamated heliostat information 1114 may be created approximately every five seconds. The time intervals between the ray tracer and amalgamated heliostat information may be tailored to site demands, and could be modified to be updated anywhere from fractions of a second to hours. The amalgamated heliostat information process 1114 may be used to determine the energy per subgroup on each panel 1116 of the central receiver. The processor may then run a linear program 1118 to determine the desired energy per subgroup 1120, which will return the highest possible total energy on the central receiver. This desired energy per subgroup may be designated by alpha. The processor may run a search program to find an optimal value of alpha 1124. The search program may include a linear program 1122, a linear walk, a binary search, a heuristic optimization, or any other search method to identify desired values. Once the search program finds an optimal alpha 1126, the processor may run a linear program 1128 to calculate the optimal energy per subgroup 1130. The processor may determine a count of the appropriate number of heliostats per subgroup to be designated 1132. The processor may then select a desired set of tracking heliostats 1134 that satisfies the determined count of appropriate heliostats per subgroup 1132.

The search program may have the goal of providing an equal number of subgroups and/or an equal amount of energy spread across the central receiver. Providing subgroups of similar size may help to minimize the total number of heliostats that need to move in the heliostat field each time a field adjustment occurs. Minimizing movements may reduce maintenance costs and/or increase heliostat lifetime. Alternatively, minimizing the variation across a receiver may help to minimize thermal cycling, which increases receiver lifetime.

The power output of a subgroup may be increased by pointing a larger fraction of the subgroup's heliostats at the central receiver. The power output of the subgroup may be decreased by pointing a smaller fraction of the subgroup's heliostats at the central receiver. In some embodiments, each heliostat field may be divided into subgroups in an arbitrary fashion. In other embodiments, each heliostat field may be divided into subgroups in order to maximize control and stability of the flux distribution on the central receiver. These distributions may be based on geographical constraints.

In an exemplary embodiment, power output may be estimated for each subgroup by a controller. The controller may be configured to determine the power output of a subgroup based on at least one of: the positions of the heliostats in the subgroup, the geometry of the heliostats in the subgroup, the position of the central receiver, the geometry of the panels of the central receiver, the number of its heliostats pointed at the central receiver, the position of the Sun, and the Direct Normal Insolation. The controller may also ensure that the power level on each panel of the receiver does not exceed a set limit. The limits on the power levels may be based on variables set by a user.

Once the power output of a subgroup is estimated, the controller may determine the power level desired from each subgroup, such that the power level requested on the receiver is achieved. The controller may further request that the subgroup provide this level of power. The controller may achieve this by determining the optimal amount of heliostats to point at the receiver such that a desired power level on the receiver is attained. The controller may also ensure that the power level on each of the panels of the central receiver does not exceed a set limit.

Linear Program Simple Procedure (LPSP)

Determining the power level desired from each subgroup, such that the power level on the central receiver may be met without exceeding the set limits of the central receiver panels, may be achieved by an exemplary controller in two exemplary steps. First, a table comprising the relative amount of power that each subgroup provides to each panel of the central receiver may be calculated. This table may be the Subgroup to Panel Contribution table (SPC), which may be a matrix representing the power that each subgroup delivers to each panel. In some embodiments, the SPC may be pre-computed. In other embodiments, the SPC may be dynamically updated as needed.

The SPC may be calculated in conjunction with a heliostat group aiming strategy. The heliostat group aiming strategy is a process by which individual heliostats, of a heliostat subgroup, are given a particular point to which to aim based on their given aim group. Each heliostat in the subgroup may be given an aim group center. The aim group center is a point to which the heliostat field should focus light. In an exemplary embodiment, the aim group center may be the center of the central receiver. Each heliostat of the heliostat subgroup may be assigned an aim point which puts light somewhere on the receiver. The information used to determine the aim points of the individual heliostats may also be used when determining the SPC used by the LPSP, and the choice of a heliostat single aim point strategy may improve both the stability of those tables and the flux uniformity on the receiver.

When a heliostat reflects flux to a given aim point, the amount of power the heliostat delivers to each panel of the central receiver may be estimated at any point in time, e.g., via ray tracing. The fraction of power that a heliostat contributes to a given panel may be close to constant with time due to at least two effects. The center of the image varies only with the geometry of the field layout, the geometry of the central receiver, and aim point choice. Further, the heliostat's image on the target may be roughly circular. All heliostats in the same subgroup may be physically close to each other in space, and as such, they may have similar geometry with respect to the receiver.

The SPC depends on the relative geometry of the field, the relative geometry of the receiver, and—to a lesser extent— on Sun position. As such, the SPC may only need to be calculated once, and reused at all times that the SPC may be needed in the future. If a higher degree of accuracy is needed, or desired, one or more versions of the SPC may be generated in order to incorporate the dependence on Sun position. An interpolation between SPCs at similar Sun positions may be used. The SPC may then be used to calculate the amount of incident flux on each central receiver panel, given the amount of power that is being provided by each subgroup.

Therefore, given two or more heliostat groups ($SG_1$, $SG_2 \ldots SG_N$) with a known maximum power that they may each deliver to the central receiver ($SG_{max1}$, $SG_{max2} \ldots SG_{maxN}$), and given the SPC and the maxima that each panel may handle ($P_{max1}$, $P_{max2} \ldots P_{maxM}$), the controller may determine the power level coming out of each subgroup level ($SGL_1$, $SGL_2 \ldots SGL_N$) such that a power level on the central receiver (T) may be achieved, and the power on each of the panels of the central receiver does not exceed a set limit ($P_{max1}$, $P_{max2} \ldots P_{maxM}$). Thus, T=Sum(SGL) over all subgroups.

The SPC may be used in a linear program to find the optimal power requested from a given subgroup ($SGL_i$). Several limits may be considered by the program. The sum, over all subgroups, of the amount of power focused on a given panel may not exceed that panel's limit. Further, the total amount of power that each subgroup provides may be less than, or equal to, what it is capable of providing. In addition, the total amount of power provided by the field may not exceed the requested throttle level. The objective function of the linear program in the system is the maximized sum of the powers requested from the subgroup throttles. In some cases, this sum may already be restricted, by a previous inequality, to be less than or equal to the throttle level. If so, the system may maximize the throttle level up to the requested value if desired. The inequalities may then be defined as:

$$(SPC)*(SGLi) \leq (P_{maxi})$$

$$(SGL_i) \leq (SG_{maxi})$$

$$(1,1,1,1\ldots,1)*(SGL_i) \leq (T)$$

Maximize: $(1,1,1,1\ldots,1)*(SGL_i)$

By combining these statements, the inequalities may be expressed in a linear programming form as:

$$\begin{pmatrix} SPC \\ \text{Identity Matrix(size of subgroup count)} \\ 1,1,1,1\ldots\ldots\ldots,1 \end{pmatrix} * (SGL_i) \leq \begin{pmatrix} P_{maxi} \\ SG_{maxi} \\ T \end{pmatrix}$$

Objective function: $(1, 1, 1, 1, \ldots, 1)$

The system may determine this linear programming form as a result, which is a list of the heliostat subgroup levels that satisfy the given inequalities. The controller may then send a command to one or more heliostats to direct flux toward, or away from, a central receiver to provide the desired amount of power from their subgroup. Accordingly, using this LPSP solution, the controller honors the panel limits, and the heliostat field provides the correct throttle power level to the central receiver.

Multiple Aim Group Generalization

An LPSP solution may be used by a controller in deciding how much power each subgroup should turn on and off. This solution intrinsically assumes that there may be only one aim group to which a given heliostat may point. In some embodiments, the controller may utilize a generalization to the LPSP solution to allow for two or more aim groups. In embodiments with multiple aim groups, there may be a different SPC for each aim group, which may allow for more control. For example, one aim group may put more flux on a superheater, while another aim group may put that flux on an evaporator. Thus, flux may be taken off the superheater, and put on the evaporator, without reducing total flux.

The controller may request, for a subgroup, the amount of power to point at each aim group in a given set of two or more aim groups. This request may be for the amount of power to put on a central receiver. This request may also be for the amount of heliostats in the subgroup to point off the central receiver. In some embodiments, the controller may order a subgroup to put heliostats onto a first aim point until it has filled up its requested level before moving onto subsequent aim points. This process assumes that the amount of power that a given heliostat may deliver when pointing to one aim group may be equal to the amount of power that the given heliostat may deliver when pointing to another aim group. This simplification may retain a high degree of accuracy so long as all of the two or more aim groups are not disposed far apart in angular space from each other. There may be a difference in the cosine loss of the heliostat with respect to the Sun in pointing a given heliostat at one of these two or more aim groups. As a result, the controller may manage requests for the heliostat subgroups, and, using the LPSP, the controller may calculate the maximum power allowed from a given subgroup.

If multiple aim groups are needed, or desired, then the SPC may depend on the aim group to which a given heliostat, or part of a heliostat subgroup, is pointing. As such, the controller may calculate the SPC once for each aim group ($SPC_1$, $SPC_2$ . . . $SPC_N$). In some embodiments, each subgroup may be further divided into a set of levels. These may be represented as subgroup levels ($SGL_{ia}$), where 'i' is the subgroup ID, and 'a' is the aim group for that subgroup. $P_{maxi}$ is the maximum power allowed on panel $P_i$. $SG_{maxi}$ is the maximum power of subgroup $SG_i$. T is the power level requested or placed on the receiver from the entire heliostat field, also known as the throttle level.

$$\begin{pmatrix} SPC1 & SPC2 & \ldots \ldots \\ \text{Identity Matrix(size} & \text{Identity Matrix(size} & \ldots \ldots \\ \text{of subgroup count)} & \text{of subgroup count)} & \ldots \ldots \\ 1,1,1,1,1,1,1,1\ldots & \ldots \ldots & \ldots,1 \end{pmatrix} * \begin{pmatrix} SGL_{i1} \\ SGL_{i2} \\ \ldots \end{pmatrix} \leq$$

$$\begin{pmatrix} P_{maxi} \\ SG_{maxi} \\ T \end{pmatrix}$$

The amount of power from each subgroup may be limited to the sum of the power to each aim group over the given subgroup. The power may still be limited on the panels, and the throttle level may still be set to the requested throttle level. By assuming the aim groups are relatively close in space, expanding the constraint matrix, and adding new variables, the controller may generalize the LPSP to two or more aim points.

Flux Distribution and Repeatability Generalization

In another embodiment, there may be additional restrictions set by the controller. An LPSP solution may be needed, or desired, that distributes the power as uniformly as possible. "Distributing the power uniformly" means that flux from the heliostats should be distributed evenly on the receiver panels or that power contribution to the receiver should be divided uniformly amongst the multiple heliostat subgroups. Further, the LPSP solution should be consistent if the inputs do not change, and should stay roughly the same if the inputs do not perturb too much, to an unacceptable level. The controller may account for these restrictions by repeatedly running an LPSP while varying the inputs. Specifically, the maximum power that each subgroup throttle can deliver may be limited to a maximum power density. The controller may assign a relative value to each LPSP solution that may be based on the largest power level of the subgroups normalized by the peak power that the given subgroup may deliver in ideal conditions. That is, the controller may compare each LPSP solution to every other LPSP solution by the largest normalized subgroup level that was used in the inputs.

The process of comparing the LPSP solutions to find an optimal result may comprise the following steps: solving a first iteration of the LPSP and delivering the solution to the controller. If the throttle level (T) obtained in the solution is less than the requested throttle level, then the first solution is utilized and the process ends. However, if this found throttle level is equal to the requested throttle level, then the controller searches amongst all possible solutions of maximum normalized subgroup levels, $SG_{maxi}$. In some embodiments, there may be an additional restriction to evenly distribute the power delivered to the receiver amongst heliostats throughout the field. For example, LPSP solutions that supply the required power to the receiver from heliostats distributed over multiple subgroups may be preferred over solutions that require 100% of the power to be delivered to the receiver from one subgroup. To satisfy this restriction, the subgroup levels may be given artificial subgroup maxima that are lower than their real maxima. These new subgroup levels have values between 0 and their maximum value $SG_{maxi}$.

$$\begin{pmatrix} SPC1 & SPC2 & \cdots & \cdots \\ IdentityMatrix & IdentityMatrix & \cdots & \cdots \\ (sizeofsubgroupcount) & (sizeofsubgroupcount) & & \\ 1,1,1,1,1,1,1,1,\ldots & \cdots & \cdots & ,1 \end{pmatrix} * \begin{pmatrix} SGL_{i1} \\ SGL_{i2} \\ \cdots \end{pmatrix} \le$$

$$\begin{pmatrix} P_{maxi} \\ SG_{maxi} * \alpha \\ T \end{pmatrix}$$

The next step in comparing the LPSP solutions is for the controller to perform a binary search of all solutions for every value of α. The lowest of these subgroup maxima (α) that still satisfies the requested throttle level (T) may then be taken as the final solution. The optimization process therefore involves binary searching all solutions to the LPSP for the maximum power delivered to the receiver from as many subgroups with the same normalized power as possible, while still satisfying the required throttle level and the complying with restrictions on power limits to each panel. Because the search over all solutions is binary, there may now be one solution to the problem, rather than a single LPSP which may have infinitely many solutions. By effectively providing a linear answer to a nonlinear problem the controller can quickly calculate a solution. In other embodiments, alternate search methods may be used instead of a binary search, for example, a linear walk, a random walk, and/or heuristic optimization.

The LPSP method returns a solution to the controller that evenly distributes the power required amongst the available subgroups to satisfy the throttle level. A more even distribution of power contributions from the heliostat subgroups allows for the minimization of equipment cycling, which may reduce capital and operating costs over the lifetime of the plant by providing a maximum amount of power delivered per equipment cycle. Equipment cycling may comprise at least one of: heliostat movement, drive movement, and thermal transients on the receiver panels.

Additionally, by utilizing the binary search method to select a solution from the set of valid solutions to the LPSP, the number of heliostats to be actuated may be distributed amongst the different field subgroups. This overcomes potential limitations of electrical power distribution to individual heliostats and improves the efficiency of plant operation. As an example, consider that a single subgroup comprising a plurality of heliostats may only draw enough power to actuate one heliostat at a time. If the plant controller requires multiple heliostats in proximity to be actuated, the heliostats in a single group may have to wait for power availability to complete their movement cycle. Distributing the heliostats to be actuated amongst multiple subgroups may reduce the time necessary to satisfy the throttle demand by reducing the likelihood of a heliostats waiting for power availability. Power to the receiver may then be maximized during significant transient periods such as plant startup.

Exemplary Embodiments

A central solar receiver power plant may comprise a throttle with two heliostat subgroups of equal size and a central receiver with two panels. The first heliostat subgroup (subgroup X) may provide 10% of its power to the first panel, and may provide 90% of its power to the second panel. The second heliostat subgroup (subgroup Y) may provide 50% of its power to the first panel, and may provide 50% of its power to the second panel. In this situation, the problem to be solved by the controller may be expressed as follows:

$$\begin{pmatrix} .1 & .5 \\ .9 & .5 \\ 1 & 0 \\ 0 & 1 \\ 1 & 1 \end{pmatrix} \begin{pmatrix} x \\ y \end{pmatrix} \le \begin{pmatrix} 100 \\ 100 \\ 50 \\ 50 \\ 100 \end{pmatrix}$$

In this example, both panels are each limited to 100 kilowatts (kW) of power, both subgroups may each generate 50 kW of power, and the requested throttle level is 100 kW. The objective function (x+y) may then be maximized by the controller at 100 kW with x and y both being 50 kW. Given the first two rows of the matrix, the panel limits may be honored, the throttle level may be achieved, and the power may be evenly distributed.

Instead of the field limits both being 50 kW, the limits set by the controller may be such that their sum may be higher than the total throttle level. In this situation, the problem may be expressed as follows:

$$\begin{pmatrix} .1 & .5 \\ .9 & .5 \\ 1 & 0 \\ 0 & 1 \\ 1 & 1 \end{pmatrix} \begin{pmatrix} x \\ y \end{pmatrix} \le \begin{pmatrix} 100 \\ 100 \\ 50 \\ 100 \\ 100 \end{pmatrix}$$

In this example, the controller may generate two or more LPSP solutions. One possible LPSP solution is x=50 and y=50. Another LPSP solution is x=0 and y=100. In this particular case, any combination between these two where the two groups still sum to 100 and x does not exceed 50 is a valid LPSP solution. All of these LPSP solutions may honor the panel limits, and may also achieve the throttle level. They may not, however, always be evenly distributed. Further, the controller may not give a consistent solution, as the LPSP may give only one of many solutions and may give a different one each time it is run.

If the controller runs the LPSP once, and the solution given is x=20 and y=80, then it is known that the ideal solution lies somewhere in between x=50 and y=50 and x=20 and y=80. Given that both of these fields are of the same size, their normalizations may be equal. In this case, the value of the given LPSP solution is 80, assuming a normalization of 1. Even distributions may have a value of 50, i.e., x=50 and y=50, but this may not honor the facet limits. The controller may then perform a binary search in between these two solutions. If the given LPSP solution does not achieve the throttle level, then the final solution may have a higher value. If the given LPSP solution does achieve the throttle level, then it must have an equal or lower value.

In this example, the next iteration of the linear program by the controller may be expressed by the following:

$$\begin{pmatrix} .1 & .5 \\ .9 & .5 \\ 1 & 0 \\ 0 & 1 \\ 1 & 1 \end{pmatrix} \begin{pmatrix} x \\ y \end{pmatrix} \le \begin{pmatrix} 100 \\ 100 \\ 50 \\ 65 \\ 100 \end{pmatrix}$$

This may then give a result between x=35 and y=65, and x=50 and y=50. This result will have achieved the given throttle level, so the final solution must then have a value between 65 and 50, and 57.5 will be attempted next. Note, however, that if the LPSP returned is between 40 and 60, then the final solution must have a value between 50 and 60, so 55 will be attempted next. This process may be continued until the difference between the lower and upper solution becomes smaller than some threshold defined by the controller. Once the solution satisfies all four conditions given above, it may be sent out to the subgroup throttles.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method of setting a throttle at a solar power plant, by a controller having a processor and addressable memory, the method comprising:
    selecting at least one aim point on a receiver of the solar power plant;
    determining two or more subgroups based on maximizing differences between a contribution of power that each subgroup delivers to each panel of the receiver;
    calculating a desired energy to be delivered by two or more subgroups to each selected aim point via a search method based on an aiming scheme, wherein the aiming scheme comprises the step of performing a ray trace to calculate the desired energy to be delivered per the determined two or more subgroups; and
    determining an optimum distribution of energy to be delivered to the receiver across the two or more subgroups via a search program based on the calculated desired energy, wherein the search program is at least one of: a linear program and a binary search.

2. The method of claim 1 further comprising:
    designating one or more heliostats of each of the two or more subgroups to deliver energy to the receiver based on the determined optimum distribution of energy.

3. The method of claim 2 further comprising:
    commanding the designated one or more heliostats to deliver energy to the receiver.

4. The method of claim 2 wherein the one or more heliostats of each of the two or more subgroups are designated to minimize the total number of heliostats moved during operation.

5. The method of claim 1 further comprising:
    determining a plurality of desired energy calculations, wherein the search program is configured to select a desired energy of the plurality of desired energy calculations based on meeting a program demand.

6. The method of claim 1 wherein the search method is configured to determine the optimum spread of energy across two or more subgroups.

7. The method of claim 1 wherein flux on the receiver is considered uniform over a receiver panel.

8. The method of claim 1 wherein determining an optimum distribution of energy to be delivered to the receiver across the two or more subgroups is further based on a set of parameters comprising at least one of the desired flux on the receiver, power availability, and the per-panel flux limits, wherein the set is used as constraints in a system of linear equations.

9. A method of controlling heliostats, by a controller having a processor and addressable memory, the method comprising:
    calculating a range of intervals to supply power to a receiver that meet a throttle power demand;
    filtering the calculated range of intervals based on a set of constraints comprising: even distribution of power contributions from heliostat subgroups, minimization of equipment cycling, and uniform control of power limits on each panel; and
    setting an optimal value across the filtered range via at least one of: a linear program and a binary search.

10. The method of claim 9 further comprising:
    commanding one or more heliostats to change position to achieve the set optimal value.

11. The method of claim 10 wherein the optimal value is updated on a recurring basis.

12. The method of claim 9 wherein the optimal value is a maxima.

13. The method of claim 9 wherein the optimal value is a minima.

14. The method of claim 13 wherein the one or more limitations are an electrical power time limit per subgroup.

15. The method of claim 9 wherein the set optimal value is further configured to satisfy at least one constraint, the constraint having a minima and a maxima, and wherein the at least one constraint includes at least one of: throttle level, average flux on a receiver, average flux on a receiver panel, peak flux on a receiver, peak flux on a receiver panel, uniformity of flux contribution from subgroups, and uniformity of flux on receiver panels.

16. A method of controlling heliostats, by a controller having a processor and addressable memory, the method comprising:
    dividing a heliostat field into one or more subgroups, wherein the division is based on: a power contribution, a minimization of heliostat movement wait time due to one or more limitations, even distribution of power contributions from heliostat subgroups, minimization of equipment cycling, and uniform control of power limits on each panel, and wherein the power contribution is further based on performing a ray trace to calculate a desired energy delivered per subgroup.

17. The method of claim 9 wherein the set optimal value is further configured to satisfy at least one constraint, the constraint having a minima and a maxima, and wherein the at least one constraint includes at least one of: throttle level, average flux on a receiver, average flux on a receiver panel, peak flux on a receiver, peak flux on a receiver panel, uniformity of flux contribution from subgroups, and uniformity of flux on receiver panels.

* * * * *